United States Patent
Ahrens et al.

(10) Patent No.: US 11,165,294 B2
(45) Date of Patent: Nov. 2, 2021

(54) PERMANENT MAGNET ROTOR WITH DISTRIBUTED PERMANENT MAGNETS

(71) Applicant: Bühler Motor GmbH, Nuremberg (DE)

(72) Inventors: Matthias Ahrens, Nuremberg (DE); Olaf Richter, Stein (DE); Georg Bernreuther, Nuremberg (DE); Nikolaus Dietrich, Nuremberg (DE); Arnold Scheer, Leipzig (DE)

(73) Assignee: BÜHLER MOTOR GMBH, Nuremberg (DE)

(*) Notice: Subject to any disclaimer, the term of this patent is extended or adjusted under 35 U.S.C. 154(b) by 195 days.

(21) Appl. No.: 15/716,688

(22) Filed: Sep. 27, 2017

(65) Prior Publication Data
US 2018/0019630 A1  Jan. 18, 2018

Related U.S. Application Data

(63) Continuation of application No. PCT/DE2016/200146, filed on Mar. 21, 2016.

(30) Foreign Application Priority Data

Apr. 2, 2015  (DE) .................... 10 2015 206 100.0

(51) Int. Cl.
*H02K 1/27* (2006.01)
*H02K 1/02* (2006.01)
(Continued)

(52) U.S. Cl.
CPC .............. *H02K 1/276* (2013.01); *H02K 1/02* (2013.01); *H02K 1/2786* (2013.01); *H02K 1/28* (2013.01);
(Continued)

(58) Field of Classification Search
CPC ........ H02K 1/278; H02K 15/03; H02K 1/276; H02K 1/02; H02K 15/12; H02K 1/2786;
(Continued)

(56) References Cited

U.S. PATENT DOCUMENTS 4,777,397 A    10/1988  Parshall
5,488,260 A *  1/1996  Heyraud ................ H02K 1/278
                                                    29/598
(Continued)

FOREIGN PATENT DOCUMENTS

GB    2 258 566 A    2/1993
JP    61-128754 A    6/1986
(Continued)

OTHER PUBLICATIONS

English machine translation, Yaguchi, JP 2007060860 (Year: 2007).*
(Continued)

*Primary Examiner* — Burton S Mullins
(74) *Attorney, Agent, or Firm* — Westerman, Hattori, Daniels & Adrian, LLP

(57) ABSTRACT

A permanent magnet rotor of an electric motor, consisting of a return body and a number of sintered permanent magnets distributed on the case of the return body at intervals, connected to a plastic mass filled with hard magnetic material. The objective of the present invention is to ensure that a generic permanent magnet rotor can be simply and economically produced, along with allowing a great degree of freedom regarding the design of the pole faces, wherein high rigidity and security of the mechanical connection between the permanent magnets and the return body are guaranteed.

8 Claims, 6 Drawing Sheets

(51) Int. Cl.
*H02K 15/03* (2006.01)
*H02K 15/12* (2006.01)
*H02K 1/28* (2006.01)
*H02K 1/04* (2006.01)

(52) U.S. Cl.
CPC ............. *H02K 15/03* (2013.01); *H02K 15/12* (2013.01); *H02K 1/04* (2013.01); *H02K 2201/06* (2013.01)

(58) Field of Classification Search
CPC ........ H02K 1/28; H02K 2201/06; H02K 1/04; H01F 7/02
USPC .......................................................... 310/43
See application file for complete search history.

(56) References Cited

U.S. PATENT DOCUMENTS

| | | | | |
|---|---|---|---|---|
| 6,856,051 | B2* | 2/2005 | Reiter, Jr. ................. | B22F 7/06 29/598 |
| 9,024,495 | B2* | 5/2015 | Brandau et al. ........ | H02K 1/278 310/156.23 |
| 2006/0055266 | A1* | 3/2006 | Iwami .................... | B22F 7/062 310/156.47 |
| 2006/0103253 | A1 | 5/2006 | Shiga et al. | |
| 2007/0210663 | A1* | 9/2007 | Kalavsky ............... | H02K 1/278 310/156.19 |
| 2014/0167531 | A1* | 6/2014 | Hangmann .............. | H02K 5/12 310/43 |

FOREIGN PATENT DOCUMENTS

| | | | | |
|---|---|---|---|---|
| JP | 2007-60860 | * | 3/2007 | ............... H02K 1/27 |
| WO | 97/45917 | * | 12/1997 | ............... H02K 1/27 |
| WO | 01/11756 A1 | | 2/2001 | |
| WO | 2013/104998 A2 | | 7/2013 | |
| WO | 2014/082840 A2 | | 6/2014 | |

OTHER PUBLICATIONS https://en.wikipedia.org/wiki/Cogging_torque. Accessed Nov. 2, 2020. (Year: 2020).*

International Search Report dated Jul. 13, 2016, issued in counterpart application No. PCT/DE2016/200146, w/English translation. (15 pages).

Search Report dated Dec. 2, 2015, issued in counterpart German Patent Application No. 10 2015 206 100.0 (7 pages).

* cited by examiner

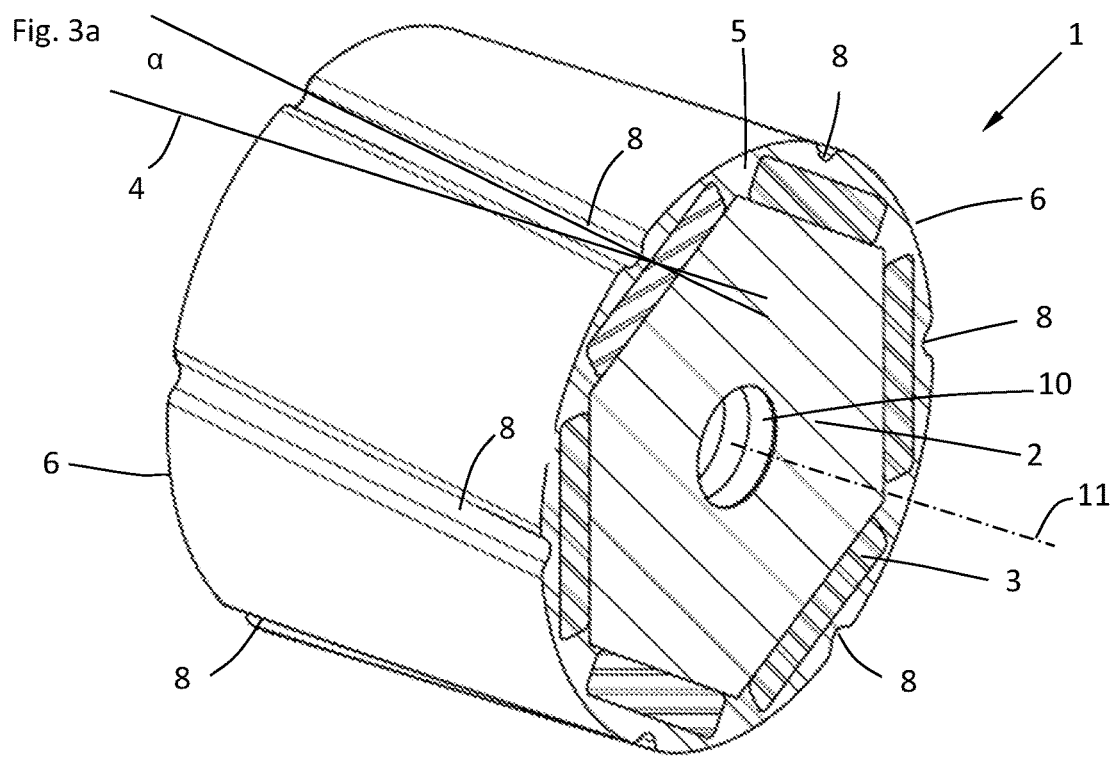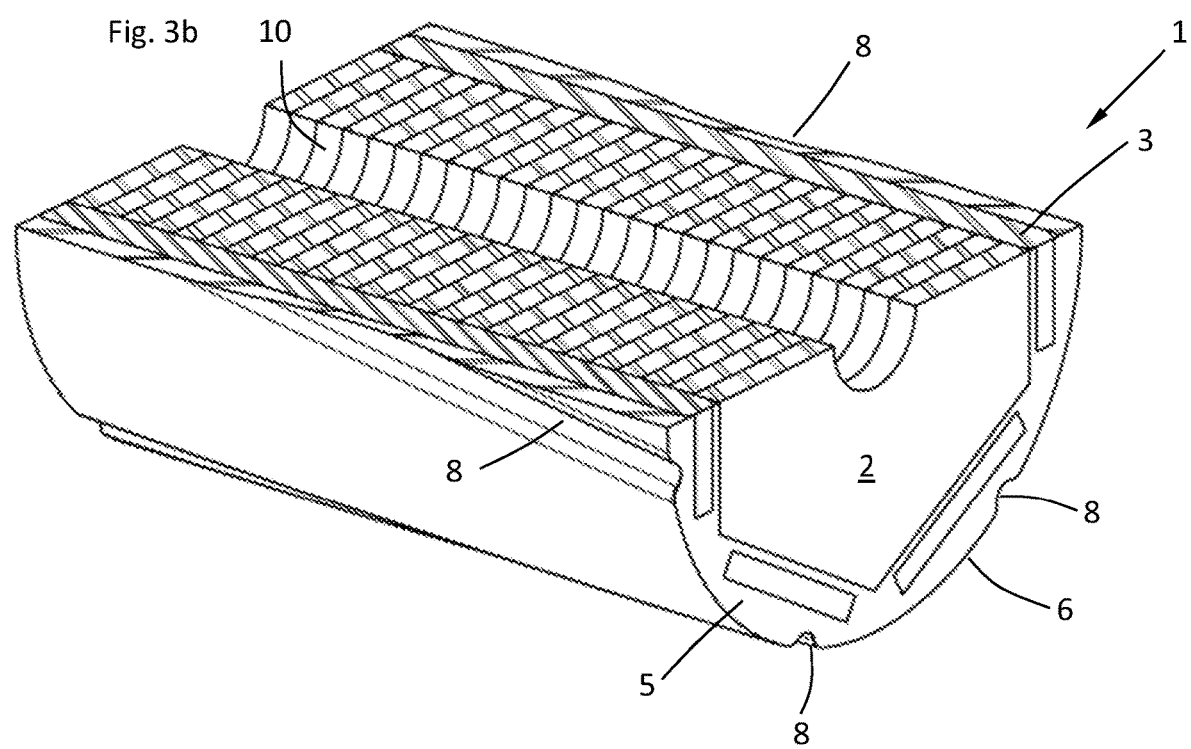

US 11,165,294 B2

PERMANENT MAGNET ROTOR WITH DISTRIBUTED PERMANENT MAGNETS

CROSS-REFERENCE TO RELATED APPLICATION

This application is a continuation application of International Application No. PCT/DE2016/200146, filed Mar. 21, 2016, which claims priority from German Application No. 10 2015 206 100.0, filed Apr. 2, 2015, the disclosures of which are incorporated herein by reference in their entireties.

BACKGROUND OF THE INVENTION

(1) Field of the Invention

The invention relates to a permanent magnet rotor of an electric motor, consisting of a return body and a number of sintered permanent magnets distributed on the case of the return body at intervals, connected to a plastic mass filled with hard magnetic material.

(2) Description of Related Art Including Information Disclosed Under 37 CFR 1.97 and 1.98

A permanent magnet rotor is known from U.S. Pat. No. 5,488,260 B1, featuring curved permanent magnets aligned on a base body and which is insert-molded with plastic or resin material filled with permanent magnet material. The production of curved permanent magnets is possible in sufficient dimensional accuracy only with significant effort. Measures for noise reduction using a special design of the pole faces, e.g., inclined grooves, are thus hardly possible— at least not at a reasonable cost.

BRIEF SUMMARY OF THE INVENTION

The objective of the present invention is to ensure that a generic permanent magnet rotor can be simply and economically produced, along with allowing a great degree of freedom regarding the design of the pole faces, wherein high rigidity and security of the mechanical connection between the permanent magnets and the return body are guaranteed.

The objective of the invention is achieved through the use of block magnets. Since the permanent magnets vary from plate-shaped to rectangular block magnets, they can be cut very accurately in large quantities with very little effort. By orienting the hard magnetic material of a plastic mass to the magnetic field lines of the pre-magnetized permanent magnets, the magnetic field of the permanent magnet rotor and thus the efficiency of the electric motor is amplified.

Expediently, the plastic mass forms an exterior cylindrically-shaped contour. Due to noise reduction requirements, it is possible that the plastic mass shows a number of flat areas on its outer radial contour. Alternatively, grooves may be included in the outer contour of the plastic mass for the same purpose. A further improvement in the cogging torque of the permanent magnet rotor is achieved by having the grooves form an inclined angle with axially parallel lines on the outer contour.

To improve the mechanical strength, the return body has radially oriented projections between the permanent magnets placed at intervals, wherein these projections preferably widen in a radius towards the outside. In particular, the magnets are each to be wider than the clearance between two adjacent projections in the radius outside the area occupied by the permanent magnets. The plastic mass is divided into many areas by the projections and has a positive-locking connection with the projections, wherein these have a dovetail-shaped contour.

A second solution of the problem is achieved by a method for producing a permanent magnet. This method includes the process steps of: a) providing a return body; b) positioning pre-magnetized permanent magnets on the return body; and c) insert-molding of the return body and the permanent magnets with a plastic mass filled with magnetic particles, wherein the magnetic particles are oriented to the magnetic fields of the pre-magnetized permanent magnets.

BRIEF DESCRIPTION OF THE SEVERAL VIEWS OF THE DRAWINGS

The invention is better understood by reading the following Detailed Description of the Preferred Embodiments with reference to the accompanying drawing figures, in which like reference numerals refer to like elements throughout, and in which:

FIG. 3a an axial section of a third embodiment of a permanent magnet rotor,

FIG. 3b a radial section of the third embodiment,

DETAILED DESCRIPTION OF THE INVENTION

Figure 1A:
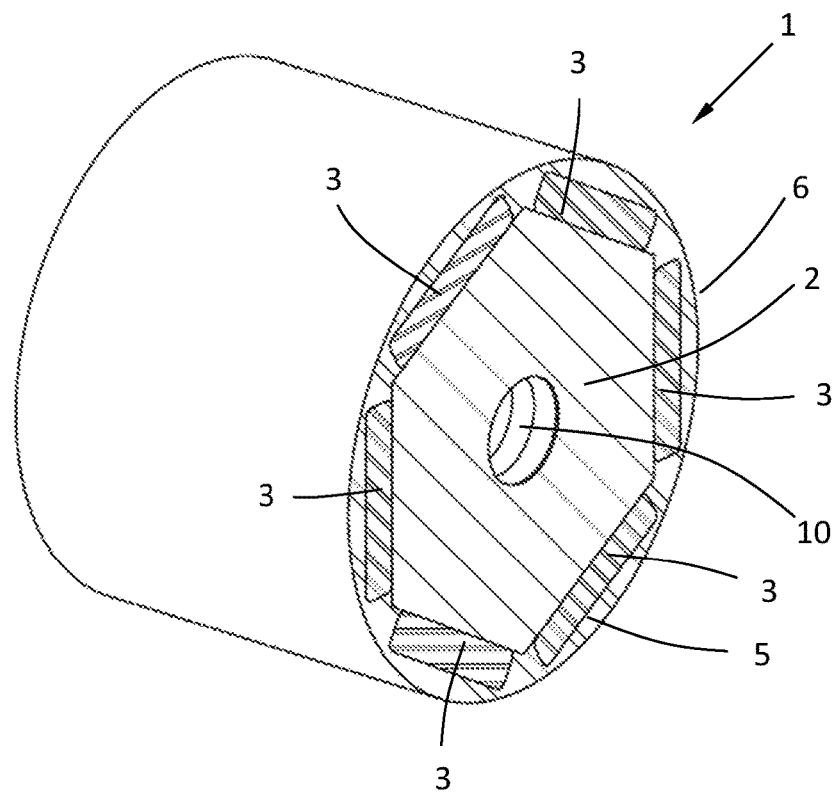
FIG. 1a an axial section of a first embodiment of a permanent magnet rotor.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

Figure 1B:
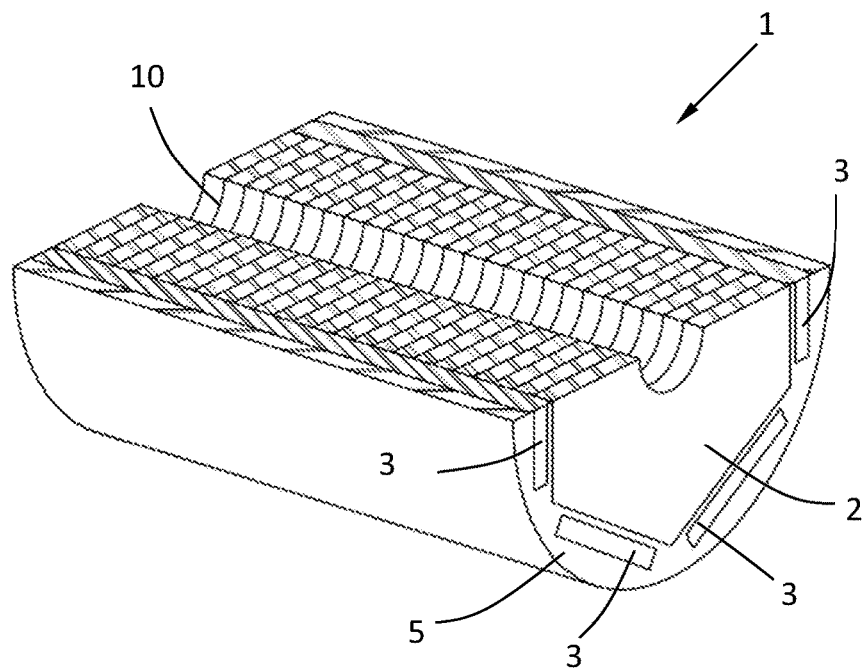
FIG. 1b a radial section of the first embodiment.

FIG. 1a shows an axial section of a first embodiment of a permanent magnet rotor 1, with a return body 2, which consists of a stack of hexagonal-shaped electrical sheets. The stack of individual sheets is shown in FIG. 1b. The return body 2 also has a cylindrically-shaped recess 10, which serves for mounting on a rotor shaft. The six surfaces of the hexagonal-shaped stack of sheets (return body 2) are joined to plate-like permanent magnets 3. These permanent magnets 3 are surrounded by a plastic mass 5 joined by a primary shaping process and filled with hard magnetic material. Primary shaping means that a part is not manufactured by a cutting process. Primary shaping means use of a molding or casting process. During the primary shaping process, the permanent magnets 3 are already pre-magnetized, whereby the hard magnetic material with which the plastic mass is filled is oriented towards the magnetic field lines of the permanent magnets 3. The outer contour of the permanent magnet rotor 1 is fully formed by the plastic mass 5 and has a cylinder surface-shaped outer contour 6. A gap remains between the permanent magnets, which is filled by the plastic mass 5. FIG. 1b shows a radial section of the first embodiment, with the return body 2 made of the stack of sheets, the permanent magnets 3, the plastic mass 5, and the cylindrically-shaped recess 10.

Figure 2A:
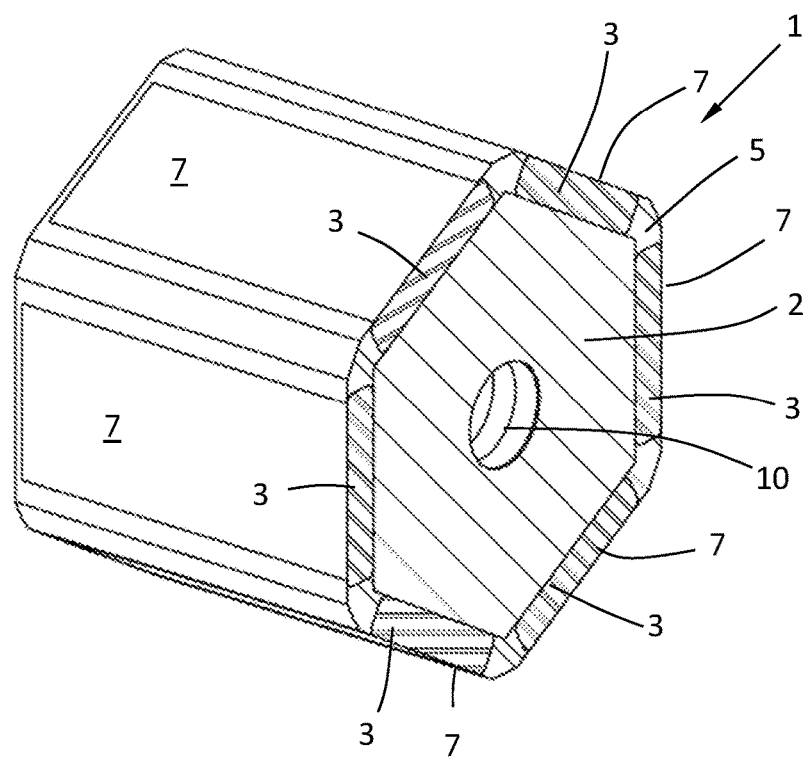
FIG. 2a an axial section of a second embodiment of a permanent magnet rotor.
Figure 2B:
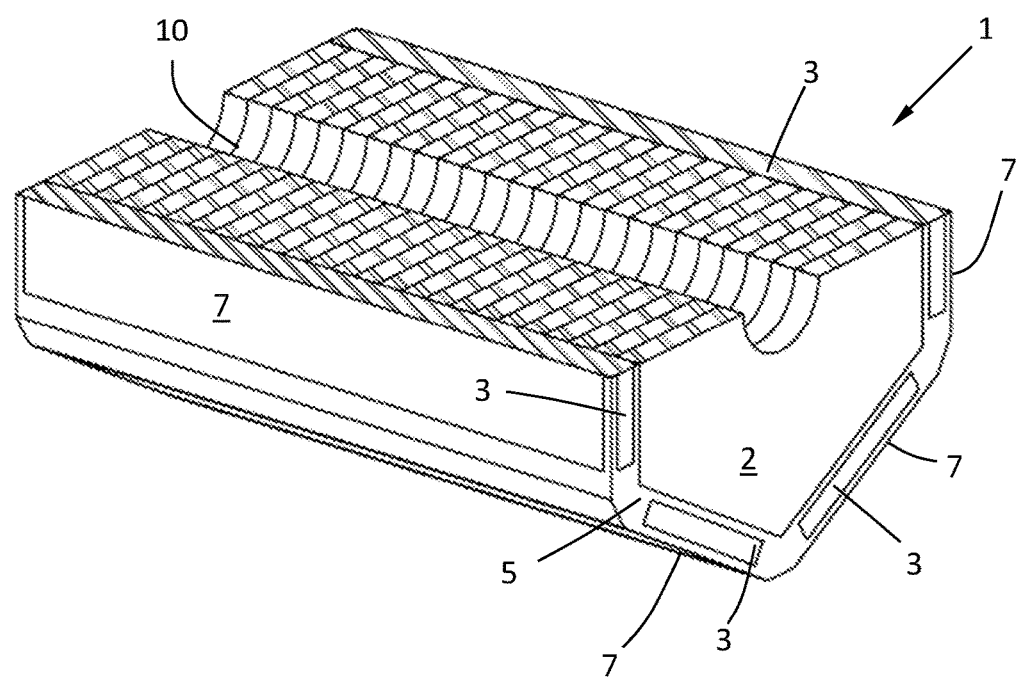
FIG. 2b a radial section of the second embodiment.

FIG. 2a shows an axial section of a second embodiment of a permanent magnet rotor 1, with a return body 2, which consists of a stack of hexagonal-shaped electrical sheets (Shown in FIG. 2b). The return body 2 also has a cylindrically-shaped recess 10, which serves for mounting on a rotor shaft. The six surfaces of the hexagonal-shaped stack of sheets (return body 2) are joined to plate-like permanent magnets 3. These permanent magnets 3 are surrounded by a plastic mass 5 joined by a primary shaping process and filled with hard magnetic material. During the primary shaping process, the permanent magnets 3 are already pre-magnetized, whereby the hard magnetic material with which the plastic mass is filled is oriented towards the magnetic field lines of the permanent magnets 3. The outer contour of the permanent magnet rotor 1 is fully formed by the plastic mass 5 and has a polygon-shaped outer contour. A gap remains between the permanent magnets, which is filled by the plastic mass 5. In contrast to the first embodiment, flat areas 7 are included here, which are aligned in parallel to the permanent magnets 3. FIG. 2b shows a radial section of the second embodiment, with the magnetic return body 2 made of the stack of sheets, the permanent magnets 3, the plastic mass 5, the flat areas 7, and the cylindrically-shaped recess 10.

FIG. 3a shows an axial section of a third embodiment of a permanent magnet rotor 1, with a return body 2, which consists of a stack of hexagonal-shaped electrical sheets (Shown in FIG. 3b). The return body 2 also has a cylindrically-shaped recess 10 which serves for mounting on a rotor shaft and which defines the axis 11 of the permanent magnet rotor 1. The six surfaces of the hexagonal-shaped stack of sheets (return body 2) are joined to plate-like permanent magnets 3. These permanent magnets 3 are surrounded by a plastic mass 5 joined by a primary shaping process and filled with hard magnetic material. During the primary shaping process, the permanent magnets 3 are already pre-magnetized, whereby the hard magnetic material with which the plastic mass is filled is oriented towards the magnetic field lines of the permanent magnets 3. The outer contour of the permanent magnet rotor 1 is fully formed by the plastic mass 5, and part of its outer contour is cylinder surface-shaped 6. A gap remains between the permanent magnets, which is filled by the plastic mass 5. In contrast to the first embodiment, this one includes grooves 8 which are aligned in a radial direction parallel to the permanent magnets 3, but have an inclined angle α with axially parallel lines 4. FIG. 3b shows a radial section of the third embodiment, with the return body 2 made of the stack of sheets, the permanent magnets 3, the plastic mass 5, the grooves 8, and the cylindrically-shaped recess 10.

Figure 4A:
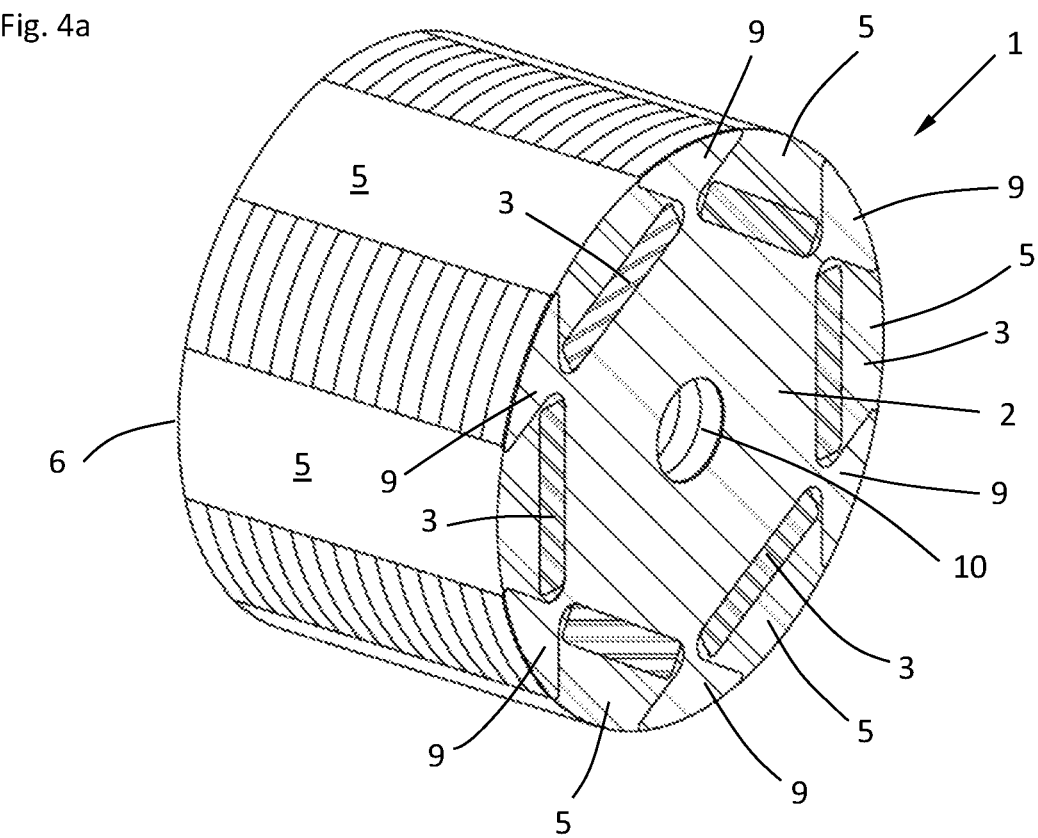
FIG. 4a an axial section of a fourth embodiment of a permanent magnet rotor.
Figure 4B:
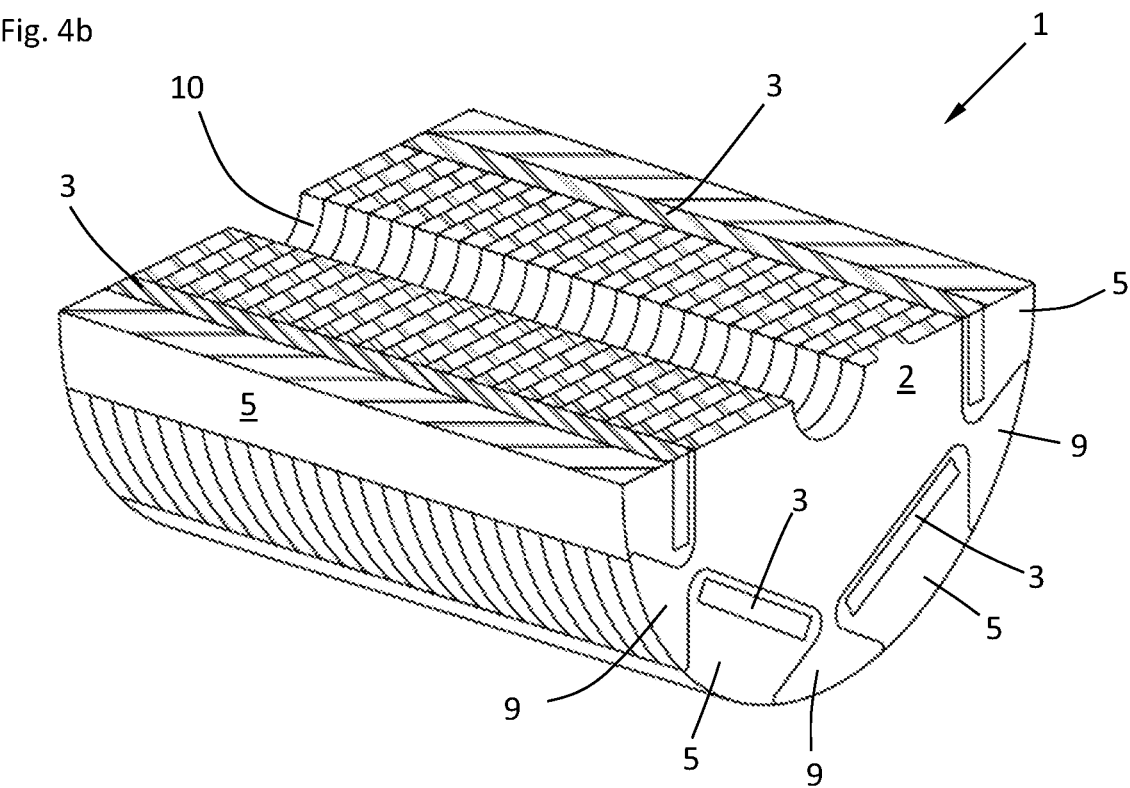
FIG. 4b a radial section of the fourth embodiment.

FIG. 4a shows an axial section of a fourth embodiment of a permanent magnet rotor 1, with a return body 2, which consists of a stack of star-shaped electrical sheets (Shown in FIG. 4b). The return body 2 also has a cylindrically-shaped recess 10, which serves for mounting on a rotor shaft. The stack of sheets (return body 2) are joined to plate-like permanent magnets 3. These permanent magnets 3 are connected to volume areas of a plastic mass 5 joined by a primary shaping process and filled with hard magnetic material. During the primary shaping process, the permanent magnets 3 are already pre-magnetized, whereby the hard magnetic material with which the plastic mass is filled is oriented towards the magnetic field lines of the permanent magnets 3. The outer contour of the permanent magnet rotor 1 is formed in part by the plastic mass 5 and in part by projections 9, which are integral with the return body 2, together forming a cylinder surface-shaped outer contour 6. The plastic mass 5 is divided into a number of spatial areas corresponding to the number of permanent magnets. FIG. 4b shows a radial section of the fourth embodiment, with the return body 2 made of the stacks of sheets, the permanent magnets 3, the plastic mass 5, the projections 9, and the cylindrically-shaped recess 10.

Figure 5A:
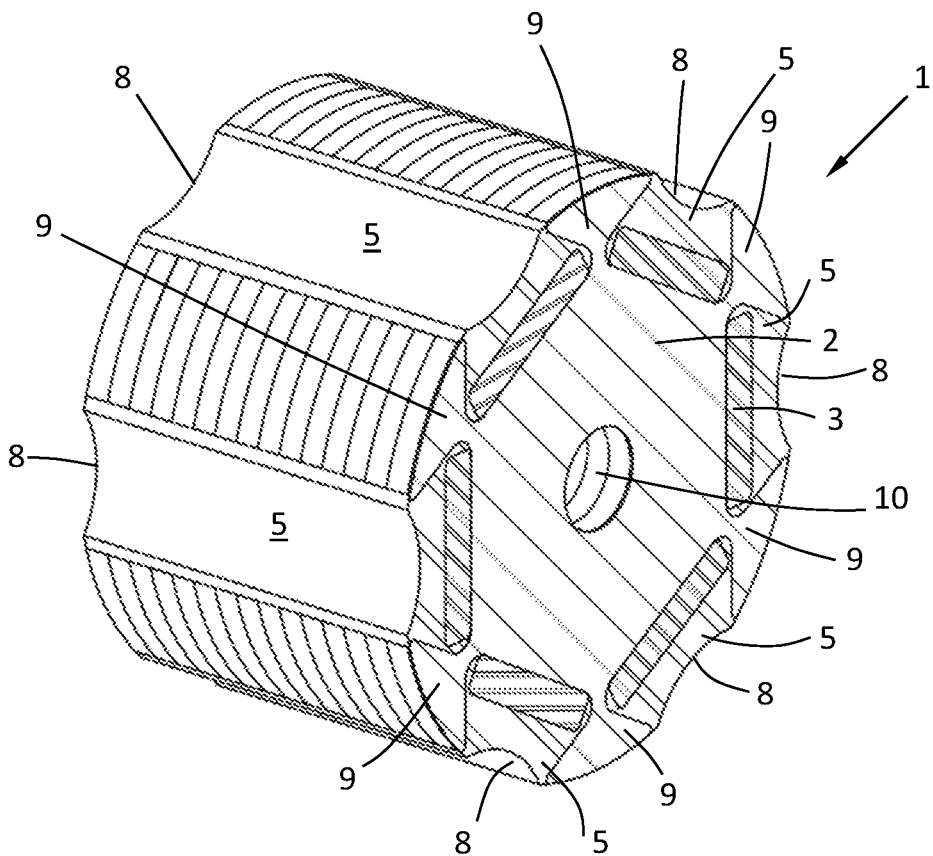
FIG. 5a an axial section of a fifth embodiment of a permanent magnet rotor.
Figure 5B:
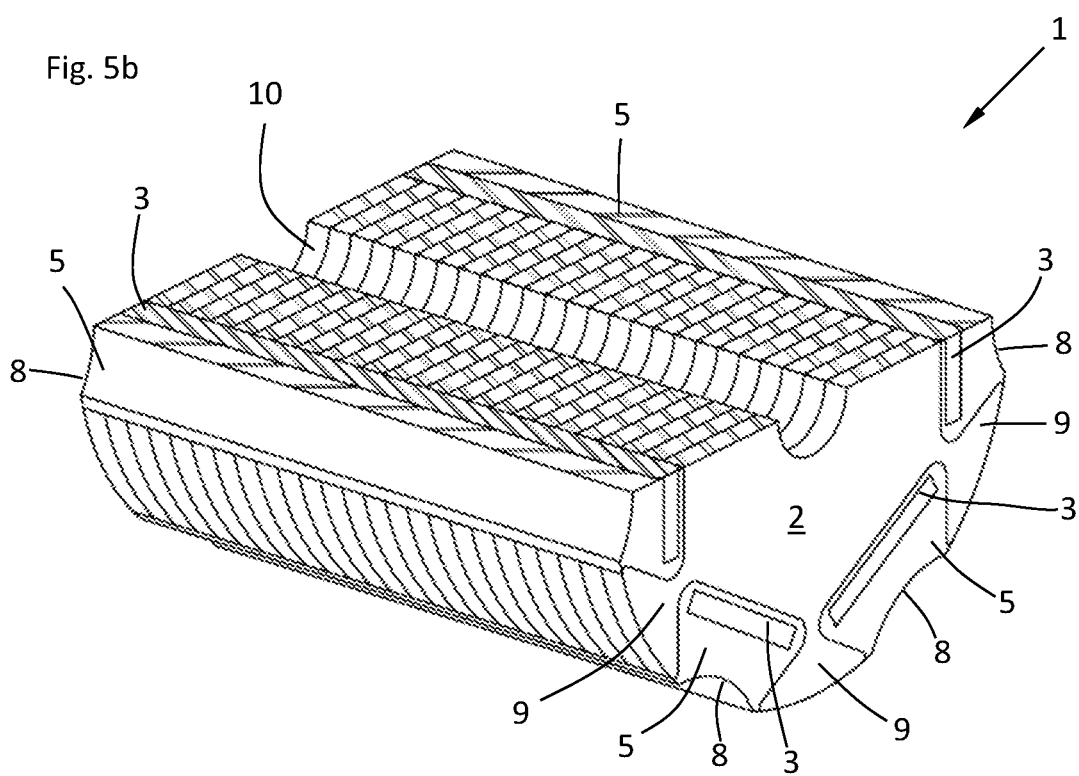
FIG. 5b a radial section of the fifth embodiment.

FIG. 5a shows an axial section of a fifth embodiment of a permanent magnet rotor 1, with a return body 2, which consists of a stack of star-shaped electrical sheets (Shown in FIG. 5b). The return body 2 also has a cylindrically-shaped recess 10, which serves for mounting on a rotor shaft. The stack of sheets (return body 2) are joined to plate-like permanent magnets 3. These permanent magnets 3 are connected to volume areas of a plastic mass 5 joined by a primary shaping process and filled with hard magnetic material. During the primary shaping process, the permanent magnets 3 are already pre-magnetized, whereby the hard magnetic material with which the plastic mass 5 is filled is oriented towards the magnetic field lines of the permanent magnets 3. The outer contour of the permanent magnet rotor 1 is formed in part by the plastic mass 5 and in part by projections 9, which are integral with the return body 2. The plastic mass 5 is divided into several separate spatial areas corresponding to the number of permanent magnets and has axially parallel grooves 8. FIG. 5b shows a radial section of the fifth embodiment, with the return body 2 made of the stack of sheets, the permanent magnets 3, the plastic mass 5, the projections 9, the grooves 8, and the cylindrically-shaped recess 10.

Figure 6A:
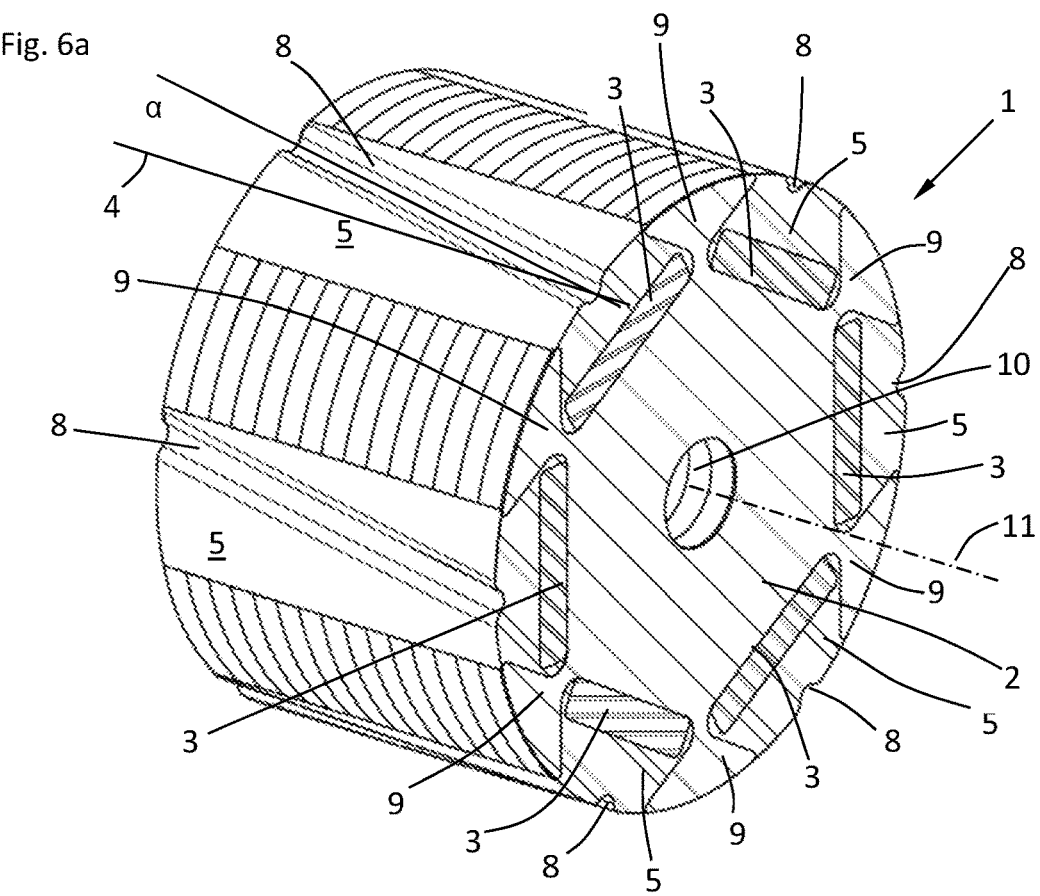
FIG. 6a an axial section of a sixth embodiment of a permanent magnet rotor.
Figure 6B:
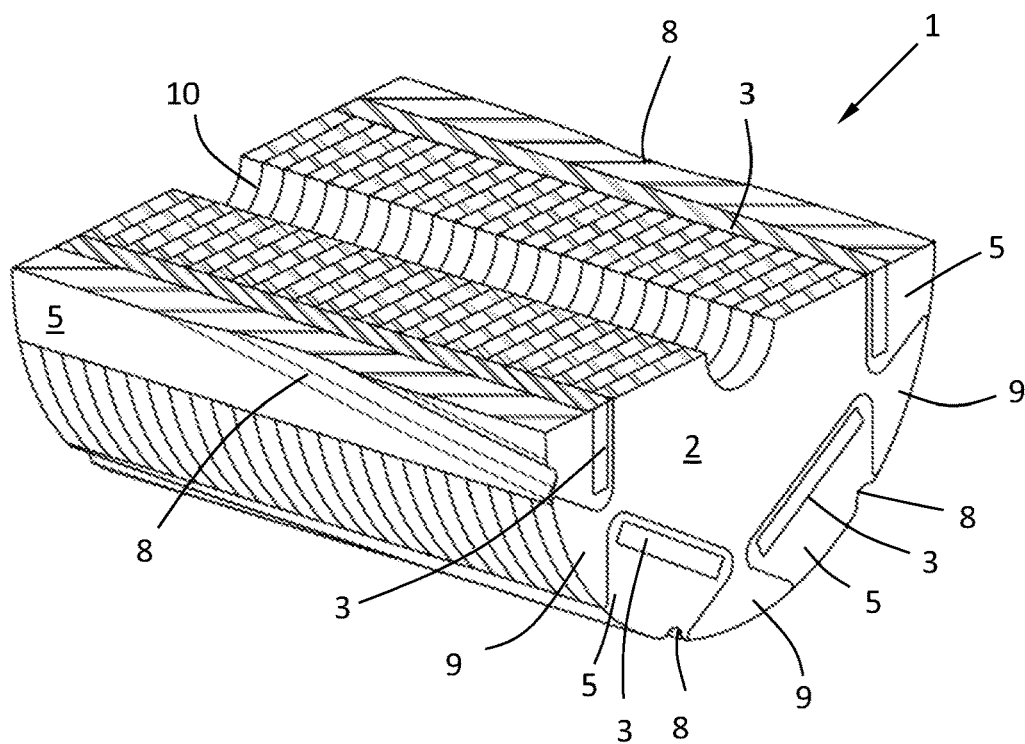
FIG. 6b a radial section of the sixth embodiment.

FIG. 6a shows an axial section of a sixth embodiment of a permanent magnet rotor 1, with a return body 2, which consists of a stack of star-shaped electrical sheets (Shown best in FIG. 6b). The return body 2 also has a cylindrically-shaped recess 10, which serves for mounting on a rotor shaft. The stack of sheets (return body 2) are joined to plate-like permanent magnets 3. These permanent magnets 3 are connected to volume areas of a plastic mass 5 joined by a primary shaping process and filled with hard magnetic material. During the primary shaping process, the permanent magnets 3 are already pre-magnetized, whereby the hard magnetic material with which the plastic mass 5 is filled is oriented towards the magnetic field lines of the permanent magnets 3. The outer contour of the permanent magnet rotor 1 is formed in part by the plastic mass 5 and in part by projections 9, which are integral with the return body 2. The plastic mass 5 is divided into several separate spatial areas corresponding to the number of permanent magnets and has grooves 8. In contrast to the fifth embodiment, the grooves 8 are inclined towards the axially parallel lines 4 by an inclined angle α. FIG. 6b shows a radial section of the sixth embodiment, with the return body 2 made of the stack of sheets, the permanent magnets 3, the plastic mass 5, the projections 9, the grooves 8, and the cylindrically-shaped recess 10.

The FIGS. 1b, 2b, 3b, 4b, 5b, and 6b further show that the filling mass 5 partially also reaches between the return body 2 and the permanent magnets 3. This is because the edges of the permanent magnets are rounded.

It is to be understood that the present invention is not limited to the illustrated embodiments described herein. Various types and styles of user interfaces may be used in accordance with the present invention without limitation. Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

LIST OF REFERENCE SYMBOLS

1 Permanent magnet rotor
2 Return body
3 Magnet
4 Axially parallel line
5 Filled plastic mass
6 Outer contour
7 Flat areas
8 Grooves
9 Projections
10 Cylindrically-shaped recess
11 Axis

What is claimed is:

1. A permanent magnet rotor of an electric motor, the rotor comprising:
   a return body;
   a number of sintered permanent magnets distributed around the return body at intervals;
   a plastic mass filled with hard magnetic material connected to the permanent magnets; wherein the permanent magnets are plate-shaped block magnets, and the hard magnetic material in the plastic mass is oriented towards magnetic field lines of the permanent magnets due to the force of the permanent magnets, the plastic mass forming an outer contour; and
   grooves formed on the outer contour;
   wherein the grooves are formed at circumferential positions that overlap with circumferential positions of the sintered permanent magnets; and
   wherein the grooves are located entirely radially outward of an outer face of the sintered permanent magnets.

2. The permanent magnet rotor according to claim 1, wherein the plastic mass forms a cylinder surface-shaped outer contour.

3. The permanent magnet rotor according to claim 1, wherein the plastic mass has a number of flat areas on its radial outer contour.

4. The permanent magnet rotor according to claim 1, wherein each of the grooves form an inclined angle relative to axially parallel lines on the outer contour.

5. The permanent magnet rotor according to claim 4, wherein the permanent magnets are spaced from each other and wherein the return body has radially oriented projections between the spaced magnets.

6. The permanent magnet rotor according to claim 5, wherein the projections widen radially towards the outside.

7. The permanent magnet rotor according to claim 6, wherein the permanent magnets are each wider than the clearance between two adjacent projections in the radial space outside the space occupied by the magnets.

8. The permanent magnet rotor according to claim 5, wherein the plastic mass is divided into several spatial areas by the projections and has a positive-locking connection with the projections.

* * * * *